Oct. 8, 1935.   H. P. HAYDEN   2,016,429
ROOFING AND METHOD OF PRODUCING
Filed Aug. 19, 1932

A = BASE
B = FOIL

WITNESS:

INVENTOR
Harold P. Hayden
BY
ATTORNEYS.

Patented Oct. 8, 1935

2,016,429

UNITED STATES PATENT OFFICE 2,016,429

ROOFING AND METHOD OF PRODUCING

Harold P. Hayden, Woodbridge, N. J., assignor to The Barber Asphalt Company, Philadelphia, Pa., a corporation of West Virginia Application August 19, 1932, Serial No. 629,418

15 Claims. (Cl. 154—2)

This invention relates to an improvement in roofing and method of producing and more particularly this invention relates to composition roofing having a metal foiled surface and to method for its production.

Composition roofing having a foiled surface has heretofore been known and has been found in principle to be advantageous more particularly in that the foil prevents or greatly limits the deleterious effects of radiant heat and sunlight on the base of such roofing, which generally comprises a felt impregnated and coated with bitumen. The effectiveness of a metal foil coating, for the preservation of composition roofing, arises from the fact that it reflects radiant heat and sunlight and hence prevents the absorption thereof by the base. Composition roofing having a foiled surface, as heretofore produced, has, however, not been entirely satisfactory, due to the fact that metal foils have a quite different coefficient of expansion from that of the bitumen impregnated and coated base and hence on heating the foil tends to and, in fact, does, become ruptured with loss of capacity to effectively function.

Heretofore various attempts have been made to avoid rupture of the foil coating on composition roofing, but none have proved acceptable with the possible exception of that involving embossing of the foil in intaglio, which while effective to minimize rupturing, is not entirely satisfactory and necessitates the use of specially designed embossing rolls, the provision of which entails expense and the use of which is undesirable from the standpoint of the effect on the base.

Now, in accordance with this invention, it has been found that the application of a metal foil coating to a composition roofing base in such a manner as to leave the foil coating wrinkled transversely and longitudinally of the base, or in effect embossed in relief, is productive of a roofing possessive of all the advantages of a foil coated roofing and, at the same time, substantially entirely free from risk of rupture by differential expansion and contraction with reference to the base.

The method in accordance with this invention will be simple and inexpensive in its practical adaptation and may be carried out without requirement for any particular form of apparatus. The method will be characterized by the application of a metal foil to an impregnated and coated base under tension causing the foil as applied to be drawn or warped with the formation of longitudinal wrinkles, or ridges, followed by a longitudinal flexing of the foil coated base for the formation of transverse wrinkles, or ridges. Alternatively, the method may be characterized by transverse and longitudinal flexing of the foil coated base, after application of the foil smoothly, for the production of longitudinal and transverse wrinkles, or ridges.

The roofing in accordance with this invention will be characterized by the fact that the foil coating will be wrinkled, or ridged, longitudinally and transversely, without definite pattern. The wrinkles or ridges will be in relief, giving the appearance of embossment in relief, and hence will be free from adherence to the base or the coating carried thereby. The longitudinal and transverse wrinkles, or ridges, in relief and free from adherence to the base, compensate for expansion and contraction of the foil coating and avoid rupture thereof.

Having now indicated in a general way the nature and purpose of this invention, I will proceed to a detailed description of preferred embodiments thereof with reference to the accompanying drawing in which.

Figure 4:
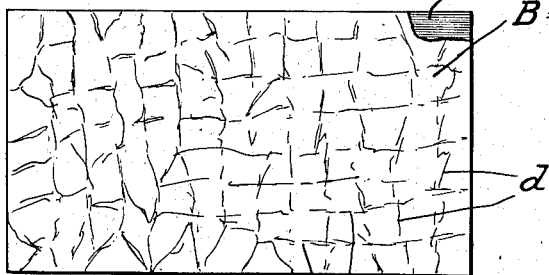
Figure 4 is a plan view of a roofing embodying this invention.

Referring more particularly to Figure 4, the roofing illustrated comprises a base A, which may be of any usual material and structure, as a felt impregnated or impregnated and coated with bitumen. The bitumen may be of any desirable type, as asphalt, either native or as produced in the refining of petroleum. Adhered to a surface of the base A, through the medium, for example, of bitumen therein or the coating of bitumen thereon, is a layer or coating of metal foil B. The metal foil is wrinkled or ridged longitudinally and transversely as indicated at c and d, respectively. The wrinkles or ridges c and d are in relief and are non-adhered to the base or at least less firmly adhered in comparison with the portions of foil intermediate to wrinkles. The foil may be composed of any suitable metal or alloy, as, for example, tin foil, lead foil, aluminum foil or the like.

Figure 1:
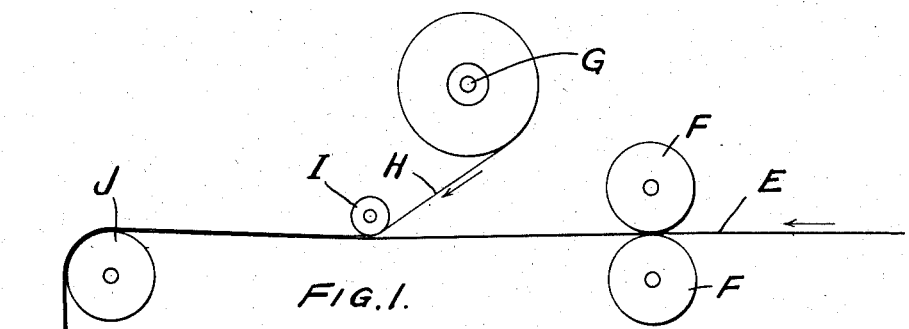
Figure 1 is a diagrammatic showing of apparatus adapted for carrying out the method in accordance with this invention.

Referring now to Figure 1, E is a roofing base such as described with reference to Figure 4. F, F are coating rolls of usual construction, by which a coating of bitumen is applied to the upper, or to both surfaces of the base E as it passes between them.

G represents a roll, carrying metal foil H, for example, aluminum foil, from which the foil is fed to the coated surface of the base E. The roll G is provided with a suitable tension device so that the foil as fed to the base is drawn or warped and consequently laid on the base wrinkled longitudinally. I is an application roll by which the foil H is drawn from the roll G and laid on the base. The longitudinal wrinkles caused by tension on the coil between the roll G and the roll I will persist or will not be removed by passage of the foil coated base beneath roll I.

J represents a roll over which the foil coated base passes with a change in direction and by which the base and foil coatings are flexed longitudinally with the production of transverse wrinkles or ridges.

Thus, in carrying out the method embodying this invention the use of the apparatus described with reference to Figure 1, it will be noted that the foil coating is wrinkled longitudinally by effecting its application to the base under tension, which causes it to be applied in a drawn or warped condition. The foil coating is then wrinkled transversely by flexing the base with the foil in place longitudinally.

Figure 2:
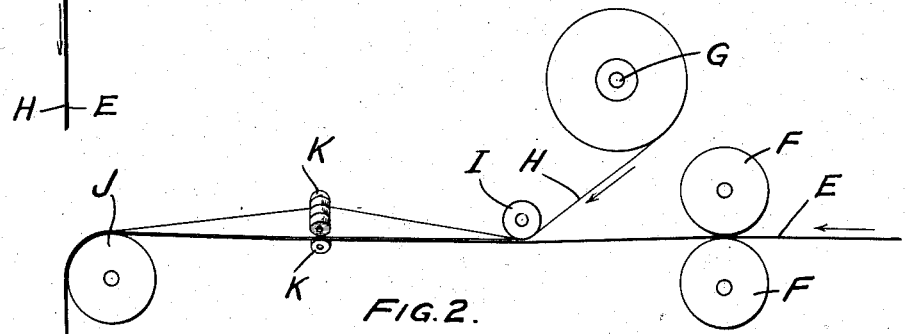
Figure 2 is a diagrammatic showing of apparatus adapted to carry out a variant of the method in accordance with this invention.
Figure 3:
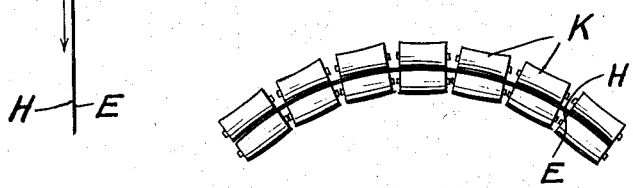
Figure 3 is a plan view of a detail of the apparatus shown in Figure 2.

Referring now to Figures 2 and 3, in which elements like those in Figure 1 are indicated by the same reference letters as used in Figure 1, the roll G is not provided with a tension device to put tension on the foil, which is applied smoothly to the coated base by the application roll I.

Between the application roll I and the roll J, which effects longitudinal flexing of the foil coated base, a plurality of rolls K are arranged to provide an arcuate pass for passage of the foil coated base. The arcuate pass formed by the rolls K effects a transverse flexing of the foil coated base with the production of longitudinal wrinkles or ridges in the foil.

Thus, proceeding with the apparatus shown in Figures 2 and 3, the foil is laid smoothly on the base and then wrinkled longitudinally and transversely by passage through the arcuate pass formed by rolls K and over roll J.

As will be appreciated, various modifications in the details of procedure over those described herein for illustrative purposes may be made without departing from this invention from the method standpoint and that various modifications in structure over that of the roofing more particularly described herein by way of illustration may be made without departing from this invention from the product standpoint.

What I claim and desire to protect by Letters Patent is:

1. A method for the production of roofing which includes applying a metal foil to a surface of a base and flexing the base to effect a wrinkling of the foil outwardly with respect to the base in a plurality of directions.

2. A method for the production of roofing which includes applying a metal foil to a surface of a bituminated base and effecting a wrinkling of the foil outwardly with respect to the base in a plurality of directions.

3. A method for the production of roofing which includes applying a metal foil to a surface of a base comprising a felt impregnated and coated with asphalt and effecting a wrinkling of the foil outwardly with respect to the base in a plurality of directions.

4. A method for the production of roofing which includes applying a metal foil to a surface of a bituminated base while maintaining the foil in its passage to the base under tension sufficient to distort it out of a plane and whereby the foil on application will be wrinkled longitudinally and flexing the combined foil and base longitudinally to effect a wrinkling of the foil transversely.

5. A method for the production of roofing which includes applying a metal foil smoothly to a surface of a base and flexing the base to effect a wrinkling of the foil outwardly with respect to the base in a plurality of directions.

6. A method for the production of roofing which includes applying a metal foil smoothly to a surface of a bituminated base, flexing the foiled base transversely and longitudinally to effect longitudinal and transverse wrinkling of the foil.

7. A method for the production of roofing which includes applying a metal foil smoothly to a surface of a bituminated base, passing the foiled base through an arcuate pass and then passing the foiled base over a roll while changing its direction of travel.

8. Roofing comprising a base having a substantially smooth surface coated with a metal foil characterized by the fact that the foil is wrinkled in a plurality of directions with respect to the surface of the base.

9. Roofing comprising a base having substantially smooth surface coated with a metal foil characterized by the fact that the foil is wrinkled outwardly with respect to the base in a plurality of directions with respect to the surface of the base.

10. Roofing comprising a base having a substantially smooth surface coated with a metal foil characterized by the fact that the foil is wrinkled outwardly with respect to the base longitudinally and transversely with respect to the surface of the base.

11. Roofing comprising a base having a substantially smooth surface coated with a metal foil characterized by the fact that the foil is embossed in relief longitudinally and transversely with respect to the surface of the base.

12. A method for the production of roofing which includes applying a metal foil to a surface of a base and flexing the base to effect a wrinkling of the foil outwardly with respect to the base.

13. A method for the production of roofing which includes applying a metal foil smoothly to a surface of a base and flexing the base to effect a wrinkling of the foil outwardly with respect to the base.

14. Roofing comprising a base having a substantially smooth surface coated with a metal foil characterized by the fact that the foil is wrinkled outwardly with respect to the surface of the base.

15. Roofing comprising a base having a substantially smooth surface coated with a metal foil characterized by the fact that the foil is wrinkled outwardly with respect to the surface of the base, whereby the foil and the base are noncontiguous at a plurality of points.

HAROLD P. HAYDEN.